Dec. 31, 1946.   C. H. CHAPIN   2,413,291
SPRING SUSPENSION
Filed May 11, 1942
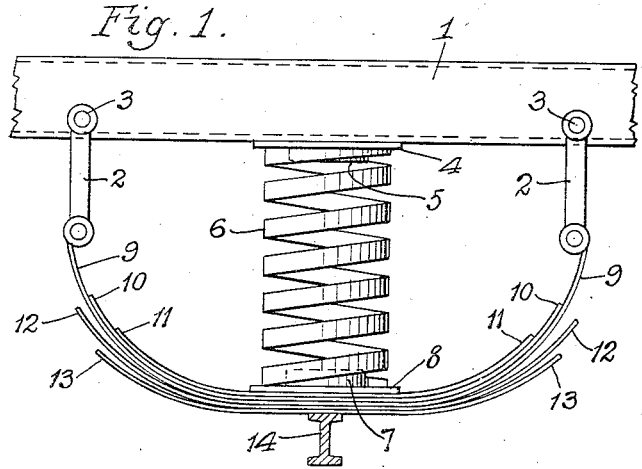
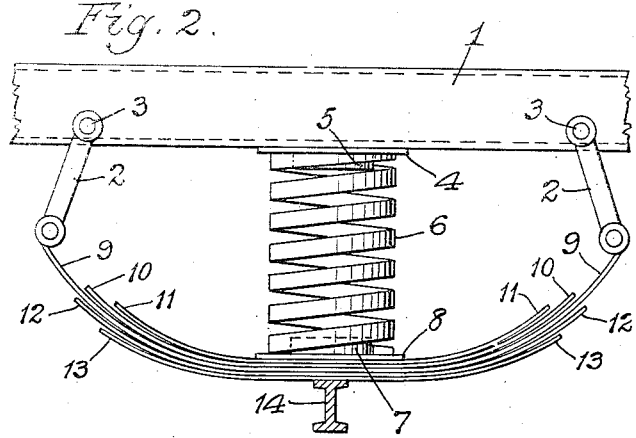
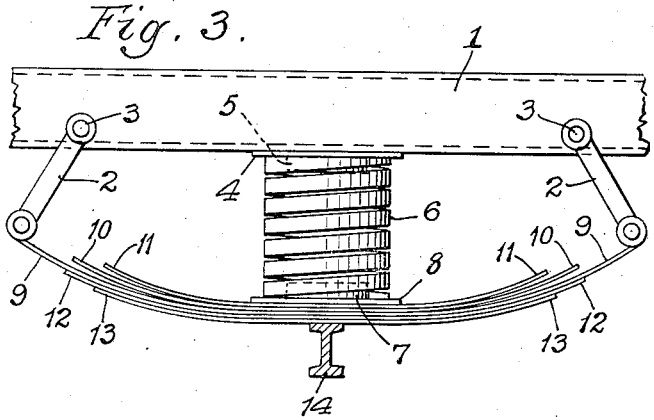
Inventor
Charles H. Chapin
by Parker & Carter
Attorneys.

Patented Dec. 31, 1946

2,413,291

UNITED STATES PATENT OFFICE 2,413,291

SPRING SUSPENSION

Charles H. Chapin, Chicago, Ill.

Application May 11, 1942, Serial No. 442,415

7 Claims. (Cl. 267—28)

This invention relates to a spring suspension, and particularly to a suspension adapted for vehicles. It has for one object to provide means for partially equalizing the riding qualities of a vehicle no matter what its condition of load. It is an important object of this invention to provide means for equalizing to some extent the spring action for all conditions of load and variations of load which are likely to be met.

A further object is to provide a combination of coil and leaf springs, so arranged and so cooperating that the tension on the springs is more or less equalized for all load and riding conditions.

Another object is to provide a spring suspension in which a plurality of springs of different types are arranged to work together so that the spring action is equalized irrespective of load variations.

Other objects will appear from time to time throughout the specification and claims.

This invention is illustrated more or less diagrammatically in the accompanying drawing, wherein:

Figure 1 is a side elevation with parts broken away and parts in section, showing one form of the device, in the position of least load, or when the vehicle is empty.

Figure 2 is a view similar to Figure 1 when the vehicle is partially loaded and the springs are therefore under partial load.

Figure 3 is a view similar to Figures 1 and 2, showing the vehicle at full load, with both springs acting together to carry the load.

Like parts are indicated by like characters throughout the specification and the drawing.

As shown in Figures 1, 2, and 3, a vehicle frame 1 is indicated diagrammatically, and shackles 2 are pivoted to the frame, as at 3. A spring perch or support 4 is mounted on the frame and is provided with a boss or centering member 5, about which one end of a spring 6 is seated. The opposite end of the spring 6 is seated about a boss 7, which is positioned upon or formed integrally with a perch or support 8.

A leaf spring made of a plurality of leaves supports the spring perch 8 and is secured to the free ends of the shackles 2. As shown diagrammatically, the spring includes a center leaf 9 which is secured at each end to one of the shackles 2, and it includes two upper leaves 10 and 11, as well as two lower leaves 12 and 13. Any desirable means for securing the spring leaves to prevent their undue separation or misplacement may be used. Such means are well known and are available on the market, and are not illustrated herewith. The leaf spring rests upon and is attached to an axle 14, no attaching means, however, being shown.

It is to be understood that in Figures 1, 2, and 3, the degree of separation and of movement of the leaves of the leaf spring has been exaggerated, and the showing, although it correctly illustrates the action which takes place, is somewhat exaggerated as to degree. This exaggeration in the drawings is necessary in order adequately to explain and illustrate the action. The form of the figures has been shown in connection with a leaf spring, which is attached to shackles at each end. Obviously, the spring mounting might be modified, and there might be a shackle at but one end, with the other end secured to a rigid support, and the invention is therefore not limited to any particular means of attachment for securing or connecting the leaf spring to the vehicle. It is to be understood, of course, that if the spring is connected to shackles at each end, it may be necessary to provide means to limit the swinging movement of the shackles, so that they may not become reversed or caught in an unsatisfactory position. This might occur unless means were arranged to prevent it, as a result of excessive spring movement which might occur when the vehicle encounters an unusually heavy bump. Such mounting and shackle controlling means are well known in the art, and none has been shown particularly in the drawing for that reason.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawing to be taken as in a broad sense illustrative or diagrammatic, rather than as limiting me to my precise showing. In particular, while only two auxiliary leaves are shown, both above and below the main leaf 9 of the leaf spring, any number might be used either above or below the main leaf 9.

It is possible also to get the general effect required by using a plurality of leaf springs. The invention is therefore not limited to any particular form of spring, nor to a combination of any particular forms of springs, and those shown are merely illustrative of suitable and effective forms and arrangements.

Although the invention as shown in the drawings is applied to the suspension for a vehicle, it is in no way limited to a vehicle suspension, and the spring arrangement and spring action illustrated and described herewith may be applied to any other use without departing from the invention. It may, for example, be used for the support of screens, such as vibrating screens or others, and the invention is therefore not limited to any particular application of the springs to any particular use or installation, and it may be applied anywhere where a spring action of the type provided is useful or desirable.

The use and operation of the invention are as follows:

As shown in Figure 1, the vehicle is to be considered as empty or carrying its minimum load. When that is the case, the entire load is carried by the spring 6, and that spring is expanded. It is expanded to such a degree that it exerts a tension upon the leaves 9, 10, and 11 of the leaf spring. The coil spring is thus carrying all of the load, and the leaf spring is working against it, and the upper auxiliary leaves of the leaf spring cooperate with the leaf 9 in working against the spring 6, while the lower leaves 12 and 13 are dormant or inactive. Under the conditions of operation shown in Figure 1, the two springs are, in effect, working against each other, and it might be said that the leaf spring limits the action or works against the action of the coil spring.

As shown in Figure 2, a partial load condition exists. The coil spring alone carries the total load. It has been somewhat compressed from the position of Figure 1 as a result of the increased load, and in the position of Figure 2, the total leaf spring is dormant. It will be seen that the spring leaves 10, 11, 12, and 13 are inactive, since they have moved out of contact with the leaf 9, and that leaf itself is inactive. It is neither carrying any of the load of the vehicle and its contents, nor is it working against nor tending to compress the coil spring.

As shown in Figure 3, maximum load conditions exist, and the coil spring has been further compressed from the position of Figures 1 and 2. When it has reached this position, the leaf spring is assisting in carrying the load. The leaf 9 is active, and the leaves 12 and 13 are also active. They are in tension and are helping to keep the load in balance while the upper auxiliary leaves 10 and 11 are dormant and are not effecting the leaf 9 nor the other leaves.

As just described, the combination of the two springs in Figures 1, 2 and 3 provides an effective spring arrangement in which, under light loads, the coil spring is under compression, not only from the load, but in addition from the action of the upper part of the leaf spring pulling down. As the load increases this pulling down action of the upper part of the leaf spring decreases until a point is reached where the coil spring alone is carrying all the load. As the load still further increases, the center leaf of the leaf spring with its lower auxiliary leaves comes into action to offer greatly increased resistance to any increasing load. From this it will be seen that we are actually using three different springs, although no more than two of them will ever be in action at the same time, the coil spring with one fixed resistance to movement, the center leaf of the leaf spring with its upper auxiliary leaves giving a different resistance to movement, and the center leaf of the leaf spring with its lower auxiliary leaves giving a still different resistance to movement.

The operation has been described above with particular reference to the spring suspension when applied to a vehicle suspension. The operation would be generally the same when the springs are applied to other uses. If the spring suspension were applied to a screen or other vibrating device subject to varying loads, the need for the device would exist, and the operation and action would be generally that described above. The description of the operation of the invention as applied to a vehicle suspension is, therefore, not to be taken as limiting the application of the invention to a vehicle suspension.

In general, it is to be understood that the coil spring 6 is, at all times, under compression but is intended to act alone only momentarily. When full load conditions exist, the central leaf 9 of the leaf spring has its lower auxiliaries 12 and 13 not only helping to carry the load, but, in many cases, carrying the major portion of the load. When the load is very light or the vehicle is empty, the coil spring 6 not only carries the load alone, but, in addition, it carries the artificial load created by the central leaf 9 of the leaf spring; and its upper auxiliaries 10 and 11 are pulling down or working in opposition. At some point between the maximum load and the very light load, the coil spring 6 carries all of the load alone with neither help nor opposition from the leaf spring. In the complete cycle of operation, the transition from one spring condition to the other is smooth and even, and the change, to a large extent, is gradual in effect.

To get the best results from this assembly, it is to be understood that the resistance to movement of the coil spring 6, when combined with the central leaf 9 of the leaf spring and its upper auxiliaries 10 and 11, may be either more, or less, or even the same as the resistance to movement of the coil spring 6 when combined with the central leaf 9 and its lower auxiliaries 12 and 13. The conditions to be met, in any particular design, would determine which arrangement would be most suitable.

I claim:

1. In combination in a spring suspension adapted to be positioned between relatively movable parts, a main spring composed of a coil spring and an auxiliary leaf spring, each arranged under certain conditions to effect and to be effected by the relative movement of said parts, said auxiliary spring and said main spring being so related to each other that, under heavy load, each acts as a load carrying member, and under minimum load, the main spring alone acts as a load carrying member, and under minimum load, the auxiliary spring acts against the main spring to place it under compression and thereby to compensate for the reduced load, and under intermediate load condition, the main spring acts as the sole load carrying member, and the auxiliary spring is dormant.

2. In combination in a spring suspension adapted to be positioned between relatively movable parts, a main coil spring and an auxiliary leaf spring, each arranged under certain conditions to effect and to be effected by the relative movement of said parts, said auxiliary leaf spring and said main coil spring being so related to each other that, under heavy load, each acts as a load carrying member, and under minimum load, the main spring alone acts as a load carrying member, and under minimum load the auxiliary spring acts against the main spring, thereby to compensate for the reduced load.

3. In combination in a spring suspension adapted to be positioned between relatively movable parts, a main coil spring and an auxiliary leaf spring, each arranged under certain conditions to effect and to be effected by the relative movement of said parts, said auxiliary leaf spring and said main coil spring being so related to each other that, under heavy load, each acts as a load carrying member, and under minimum load, the main coil spring alone acts as a load carrying member, and under minimum load, the auxiliary leaf spring acts against the main coil spring to place it under compression and thereby to compensate for the reduced load, and under intermediate load condition, the main coil spring acts as the sole load carrying member, and the auxiliary leaf spring is dormant.

4. In combination in a vehicle suspension, a plurality of springs of different types, arranged to cooperate with each other and including a main coil spring and an auxiliary leaf spring, said auxiliary leaf spring having a center leaf and a plurality of leaves positioned some on each side of said center leaf, said vehicle including a body and an axle, some of said springs being positioned to support said body from said axle, each of said springs being connected to said body, said springs being so arranged and proportioned that one of them—namely, the coil spring—comprises the main load supporting member, and the other—namely, the leaf spring—comprises an auxiliary load supporting member, said coil spring supporting the main load throughout and being in compression at all loads, said leaf spring supporting a part of the load during maximum load condition, and exerting compression upon said main spring during light load condition, and being dormant during a momentary medium load condition.

5. In combination in a spring suspension, a plurality of springs, all securely tied in place at all times, including a coil spring which at all times is in compression and a leaf spring composed of two separate units and a center leaf common to both, said separate units mounted to operate independently, each acting in combination with the coil spring under a different condition of load, said two leaf spring units never acting together.

6. In combination a pair of spaced relatively movable load supporting members, spring suspension means therefor comprising a coil spring member interposed between said members and having its opposite ends operatively engaging said members to yieldingly resist movement of said members toward each other, and leaf spring means including a center leaf member together with means operatively connecting opposite ends of said center leaf with one of said members and an intermediate portion thereof with said other member; said leaf spring means including auxiliary leaf members operatively associated with said center leaf member and disposed on opposite sides thereof in the direction of flexure, one of said auxiliary leaf members, under conditions of minimum load, yieldingly engaging said center leaf member and operating to artificially load the coil spring member while the other auxiliary leaf member lies dormant, and, under conditions of overload, said second mentioned auxiliary leaf member yieldingly resists deformation of said center leaf member and aids it in supporting the load together with said coil spring, while the first mentioned auxiliary leaf member lies dormant.

7. In combination a pair of spaced relatively movable load supporting members, spring suspension means yieldingly resisting movement of said members toward each other, including a spring member yieldingly maintaining said members in spaced relation and being operatively connected thereto under compression, a leaf spring member including a center leaf together with means operatively connecting opposite ends thereof to one of said members and its intermediate portion to the other of said members, auxiliary leaf members operatively associated with said center leaf member and disposed on opposite sides thereof, one of said auxiliary leaf members being disposed above said center leaf member and, under conditions of minimum load, yieldingly engaging said center leaf member to artificially load said first mentioned spring member while the other auxiliary leaf member lies dormant, said other auxiliary leaf member being positioned below said center lead and, under conditions of overload, yieldingly resisting deformation of said center leaf and aiding it in supporting the load together with said first mentioned spring while said one auxiliary leaf member lies dormant, both said auxiliary leaf members, under conditions of normal load, being dormant.

CHARLES H. CHAPIN.